(12) United States Patent
Mondal et al.

(10) Patent No.: US 11,049,040 B2
(45) Date of Patent: Jun. 29, 2021

(54) METHOD AND SYSTEM FOR GENERATING SYNCHRONIZED LABELLED TRAINING DATASET FOR BUILDING A LEARNING MODEL

(71) Applicant: Wipro Limited, Bangalore (IN)

(72) Inventors: Subhas Chandra Mondal, Bangalore (IN); Aravind Ravi, Bangalore (IN); Pallavi Suresh Mastiholimath, Bangalore (IN)

(73) Assignee: Wipro Limited, Bangalore (IN)

(*) Notice: Subject to any disclaimer, the term of this patent is extended or adjusted under 35 U.S.C. 154(b) by 649 days.

(21) Appl. No.: 15/935,752

(22) Filed: Mar. 26, 2018

(65) Prior Publication Data

US 2019/0287031 A1    Sep. 19, 2019

(30) Foreign Application Priority Data

Mar. 17, 2018    (IN) .............................. 201841009850

(51) Int. Cl.
*G06N 20/00* (2019.01)
*H04L 29/06* (2006.01)

(52) U.S. Cl.
CPC .......... *G06N 20/00* (2019.01); *H04L 65/4069* (2013.01)

(58) Field of Classification Search
CPC .... G06N 20/00; G06N 5/003; H04L 65/4069; H04L 65/602; H04L 65/80; H04L 65/4084
See application file for complete search history.

(56) References Cited

U.S. PATENT DOCUMENTS

| | | | |
|---|---|---|---|
| 9,204,329 B2 | 12/2015 | Boyle et al. | |
| 2015/0289149 A1* | 10/2015 | Ouyang | H04W 16/18 370/252 |

(Continued)

FOREIGN PATENT DOCUMENTS

JP    2016171580 A    9/2016

OTHER PUBLICATIONS

"Verizon* & Intel® Network Builders Innovation Challenge", 2016, 7 pages, Intel Corporation, Retrieved from the Internet: <https://networkbuilders.intel.com/verizon-intel-network-builders-innovation-challenge>.

(Continued)

*Primary Examiner* — Charles C Jiang
*Assistant Examiner* — Shawn D Miller
(74) *Attorney, Agent, or Firm* — Finnegan, Henderson, Farabow, Garrett & Dunner, LLP

(57) ABSTRACT

Disclosed subject matter relates to supervised machine learning including a method and system for generating synchronized labelled training dataset for building a learning model. The training data generation system determines a timing advance factor to achieve time synchronization between User Equipment (UE) and network nodes, by signalling the UE to initiate playback of the multimedia content based on the timing advance factor. The training data generation system receives network Key Performance Indicator (KPI) data from the network nodes and a user experience data from the UE, concurrently, for the streamed multimedia content, and performs timestamp based correlation to generate a synchronized labelled training dataset for building a learning model. The learning model is further deployed in external analytics system to act as a non-intrusive passive probe to predict real-time user experience, without intruding into the UE, thereby sustaining privacy of the user and eliminating additional computing load on the UE.

27 Claims, 7 Drawing Sheets

(56) References Cited

U.S. PATENT DOCUMENTS

| | | |
|---|---|---|
| 2016/0180248 A1 | 6/2016 | Regan et al. |
| 2017/0244777 A1 | 8/2017 | Ouyang et al. |
| 2017/0289226 A1* | 10/2017 | Deshpande ............. H04L 67/10 |
| 2019/0159048 A1* | 5/2019 | Feldkamp ............. H04W 24/08 |
| 2019/0392318 A1* | 12/2019 | Ghafoor ............... G06K 9/6256 |

OTHER PUBLICATIONS

"Intel Network: "@Wipro shares their experience from the #IntelBuilders & Verizon innovation challenge"", 1 page, Intel Corporation, Retrieved from the Internet: <ttps://www.periscope.tv/Intelnetwork/1DXxyoNVpEZGM>, Last Accessed Mar. 26, 2018.

"Network Analytics Innovation—Intel® Chip Chat: Network Insights episode 85", 1 page, Mar. 2017, Intel Corporation, Retrieved from the Internet: <https://soundcloud.com/intelchipchat-networkinsights/wipro_nas>.

Modal, "Cloud RAN—Enhancing Customer Experience With Real-Time Analytics", Jun.-Nov. 2017, 4 pages, Wipro, Retrieved from the Internet: <http://www.wipro.com/documents/Cloud-RAN-Enhancing-customer-experience-with-real-time-analytics.pdf>.

Paudyal et al., "ReTRiEVED Video Quality Database", 2 pages, Universitàdegli studi Roma Tre, Retrieved from the Internet: <http://www.comlab.uniroma3.it/retrieved.htm>, Last Accessed Mar. 26, 2018.

\* cited by examiner

METHOD AND SYSTEM FOR GENERATING SYNCHRONIZED LABELLED TRAINING DATASET FOR BUILDING A LEARNING MODEL

This application claims the benefit of Indian Patent Application Serial No. 201841009850, filed Mar. 17, 2018, which is hereby incorporated by reference in its entirety.

FIELD

The present subject matter relates generally to machine learning model, and more particularly, but not exclusively to a method and a system for generating synchronized labelled training dataset for building a learning model.

BACKGROUND

Generally, supervised machine learning initially includes training a machine capable of supervised learning for performing certain tasks based on input and a corresponding output. Thereafter, the machine would automatically provide an output for any new input based on the training. In order to train the machine, a training dataset is of utmost importance and to ensure accurate computation of the output by the trained machine, a synthesized and curated logical dataset is required. Therefore, accurate data related to desired use cases would be required from multiple data sources to arrive at the synthesized and curated logical dataset.

However, each data source may be associated with an independent timing clock. Therefore, the data received from each data source may have different timestamps though they are collected at the same instance. Such time varying data received from multiple data sources may be treated as a valid dataset only when the timing clock associated with each data source is synchronized and accordingly the collected data is correlated, thereby generating a logical dataset. However, the existing systems have not addressed this problem related to collection and correlation of time varying data from multiple data sources.

Further, in the existing techniques, the data collection such as collection of Key Performance Indicators (KPI) from network nodes is performed by introducing an external probe into the network infrastructure, which is an intrusive and expensive mechanism. Furthermore, considering User Equipment (UE) as one of the data sources for a desired use case, few of the existing techniques introduce monitoring applications in the UE to collect data related to the use case, such as video streaming. However, introducing monitoring applications in the UE may interfere with privacy of the user and also may incorporate an additional computing load on the UE, thereby resulting in deteriorating performance of the UE.

Therefore, the existing techniques do not provide a passive and an effective mechanism for collecting data from multiple data sources, without using monitoring applications that increase computing load on the UE. Also, the existing techniques do not provide a mechanism for effective timing synchronization between multiple data sources that helps in reducing time and efforts involved in correlation of the data to generate the logical dataset.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating synchronized labelled training dataset for building a learning model. The method includes determining, by a training data generation system, timing parameters related to a User Equipment (UE) capable of receiving a multimedia content and timing parameters related to one or more network nodes used to facilitate streaming of the multimedia content to the UE. Further, the training data generation system determines a timing advance factor based on the timing parameters related to the UE and the timing parameters related to the one or more network nodes to achieve time synchronization between the UE and the one or more network nodes. Furthermore, the training data generation system signals the UE to initiate playback of the multimedia content based on the timing advance factor. Upon signalling the UE, the training data generation system receives network Key Performance Indicator (KPI) data from the one or more network nodes and a user experience data from the UE, concurrently, for the streamed multimedia content. Finally, the training data generation system correlates the user experience data with the corresponding network KPI data, based on timestamp corresponding to the user experience data and the network KPI data, to generate a synchronized labelled training dataset for building a learning model.

Further, the present disclosure includes a training data generation system for generating synchronized labelled training dataset for building a learning model. The training data generation system includes a processor and a memory communicatively coupled to the processor. The memory stores the processor-executable instructions, which, on execution, causes the processor to determine timing parameters related to a User Equipment (UE) capable of receiving a multimedia content and timing parameters related to one or more network nodes used to facilitate streaming of the multimedia content to the UE. Further, the processor determines a timing advance factor based on the timing parameters related to the UE and the timing parameters related to the one or more network nodes to achieve time synchronization between the UE and the one or more network nodes. Furthermore, the processor signals the UE to initiate playback of the multimedia content based on the timing advance factor. Upon signalling the UE, the processor receives network Key Performance Indicator (KPI) data from the one or more network nodes and a user experience data from the UE, concurrently, for the streamed multimedia content. Finally, the processor correlates the user experience data with the corresponding network KPI data, based on timestamp corresponding to the user experience data and the network KPI data, to generate a synchronized labelled training dataset for building a learning model.

Furthermore, the present disclosure comprises a non-transitory computer readable medium including instructions stored thereon that when processed by at least one processor causes a training data generation system to perform operations comprising determining timing parameters related to a User Equipment (UE) capable of receiving a multimedia content and timing parameters related to one or more network nodes used to facilitate streaming of the multimedia content to the UE. Further, the instructions cause the processor to determine a timing advance factor based on the timing parameters related to the UE and the timing parameters related to the one or more network nodes to achieve time synchronization between the UE and the one or more network nodes. Furthermore, the instructions cause the processor to signal the UE to initiate playback of the multimedia content based on the timing advance factor. Upon signalling the UE, the instructions cause the processor to receive network Key Performance Indicator (KPI) data from the one or more network nodes and a user experience data from the UE, concurrently, for the streamed multimedia content. Finally, the instructions cause the processor to correlate the user experience data with the corresponding network KPI data, based on timestamp corresponding to the user experience data and the network KPI data, to generate a synchronized labelled training dataset for building a learning model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
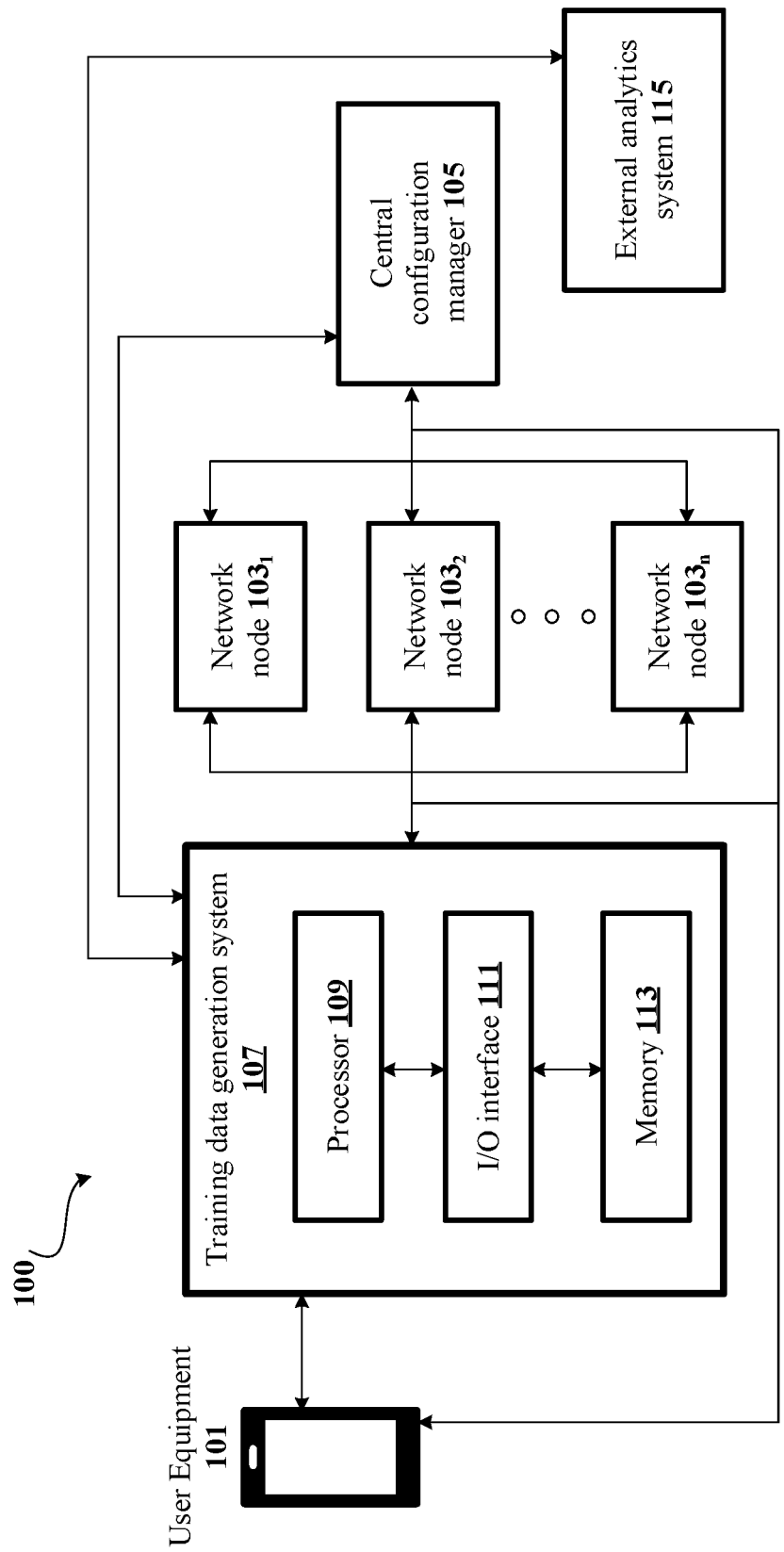
FIG. 1 shows an exemplary architecture for generating synchronized labelled training dataset for building a learning model in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating synchronized labelled training dataset for building a learning model. A training data generation system may determine timing parameters related to a User Equipment (UE) capable of receiving a multimedia content and timing parameters related to one or more network nodes used to facilitate streaming of the multimedia content to the UE. As an example, the multimedia content may include, but not limited to, video and audio. In some embodiments, the timing parameters may be determined in a simulated environment. In some other embodiments, the timing parameters may be determined in a real-time field environment. Further, the training data generation system may determine a timing advance factor based on the timing parameters related to the UE and the timing parameters related to the one or more network nodes to achieve time synchronization of information collected from the UE and the one or more network nodes in order to create a synchronized labelled training dataset. The time synchronization reduces time and efforts involved in correlation of a network Key Performance Indicator (KPI) data and a user experience data that may be received from the one or more network nodes and the UE respectively.

Further, the training data generation system may signal the UE to initiate playback of the multimedia content based on the timing advance factor. Upon signalling the UE, the training data generation system may receive the network KPI data from the one or more network nodes and the user experience data from the UE, concurrently, for the streamed multimedia content. The present disclosure provides a feature wherein the user experience data received from the UE is subjected to quality check, for understanding usability of the user experience data of that sample, for building the learning model. Finally, the training data generation system correlates the user experience data with the corresponding network KPI data, based on timestamp corresponding to the user experience data and the network KPI data, to generate the synchronized labelled training dataset for building a learning model. Upon generating the learning model, the training data generation system may deploy the learning model into an external analytics system associated with the training data generation system. The present disclosure provides a feature wherein the learning model built and deployed into the external analytics system acts as a non-intrusive passive probe to predict real-time user experience related to the multimedia content, without intruding into the UE, thereby sustaining privacy of the user. Also, the non-intrusive passive probe mechanism may eliminate additional computing load on the UE without necessitating external passive probes. This new mechanism performed using the training data generation system, enables performing customer experience management with high precision, though the external passive probes are not used. Further, the training data generation system may validate accuracy of real-time predictions of the external analytics system at regular intervals and subsequently rebuild the learning model, based on result of the validation.

A description of an embodiment with several components in communication with each other does not imply that all such components are required. On the contrary a variety of optional components are described to illustrate the wide variety of possible embodiments of the invention.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating synchronized labelled training dataset for building a learning model in accordance with some embodiments of the present disclosure.

The architecture 100 includes a User Equipment (UE) 101, network node $103_1$ to network node $103_n$ (also referred as one or more network nodes 103), a Central Configuration Manager (CCM) 105, a training data generation system 107 and an external analytics system 115. The present disclosure is described specific to a use case that involves improving user experience when the user is accessing multimedia content streamed on the UE 101 via the one or more network nodes 103. However, this should not be construed as a limitation to the present disclosure.

In some embodiments, the UE 101 and the one or more network nodes 103 are associated with the training data generation system 107 via a communication network (not shown in the FIG. 1). As an example, the communication network may be at least one of a wired communication network and a wireless communication network. As an example, the UE 101 may include, but not limited to, a mobile, a tablet, a laptop and a desktop, that is capable of accessing the multimedia content streamed using the one or more network nodes 103. As an example, the one or more network nodes 103 may include, but not limited to, Evolved NodeB (eNodeB).

Further, each of the one or more network nodes 103 may be associated with the CCM 105 which in turn is associated with the training data generation system 107 via the communication network. In some embodiments, the CCM 105 is a central entity that may be responsible for configuring the UE 101 and the one or more network nodes 103 with parameters related to network KPI data, time synchronization and a rebuilding criteria for the learning model, by communicating a metadata model to the UE 101 and each of the one or more network nodes 103. In some embodiments, the metadata model may include, but not limited to, one or more data collection templates and parameters related to the network KPI data, the time synchronization and the rebuilding criteria for the learning model. In some embodiments, the training data generation system 107 may control communication between the UE 101 and the one or more network nodes 103 using the metadata model.

In some embodiments, the training data generation system 107 may include, but not limited to, a processor 109, an Input/Output (I/O) interface 111 and a memory 113. Initially, the processor 109 may determine timing parameters related to the UE 101 which is capable of receiving a multimedia content. As an example, the timing parameters related to the UE 101 may include, but not limited to, Round trip time between a processor 109 of the training data generation system 107 and the UE 101 for receiving user experience data ($RTT_{UE}$). As an example, the timing parameters related to the one or more network nodes 103 may include, but not limited to, Round trip time between the processor 109 and the one or more network nodes 103 ($RTT_{NN}$) for receiving network Key Performance Indicators (KPI) data, predefined sample intervals ($\Delta T_{CI}$) and timestamp of network KPI records per sample ($T_{KPIN(i)}, T_{KPIN(i+1)}, - - - T_{KPIN(i+n)}$).

Further, the processor 109 may determine a timing advance factor ($\Delta T_{LEA}$) based on the timing parameters related to the UE 101 and the timing parameters related to the one or more network nodes 103 that help in achieving time synchronization between the UE 101 and the one or more network nodes 103. In some embodiments, the timing advance factor may be defined as the amount of time prior to which the processor 109 may signal the UE 101 to initiate playback of the multimedia content. In some embodiments, the timing advance factor may compensate latency between the processor 109 and the UE 101, and the processor 109 and the one or more network nodes 103.

Upon determining the timing advance factor, the processor 109 may signal the UE 101 to initiate playback of the multimedia content, based on the timing advance factor. The timing advance factor ensures that the multimedia content is initiated in the UE 101 simultaneously, when collection of the network KPI data starts in the one or more network nodes 103. Further, the I/O interface 111 may be configured to receive the network KPI data from the one or more network nodes 103 and a user experience data from the UE 101, concurrently, for the streamed multimedia content. In some embodiments, the user experience data may include, but not limited to, UE Identifier (ID), multimedia content type, predefined sample intervals, Mean Opinion Score (MOS), timestamp of the MOS and a label type. In some embodiments, the network KPI data may include, but not limited to, type of network KPIs and corresponding data types, network node layer ID, network KPI record count per sample, network KPI values, the predefined sample intervals and timestamp of network KPI records. Furthermore, the processor 109 may correlate the user experience data with the corresponding network KPI data, based on timestamp corresponding to the user experience data and the network KPI data, to generate a synchronized labelled training dataset for building a learning model. In some embodiments, the processor 109 may build the learning model using one or more predefined model building techniques.

Further, the processor 109 may deploy the learning model in the external analytics system 115 associated with the training data generation system 107. In some embodiments, the processor 109 may deploy the learning model in the external analytics system 115 using an Application Programming Interface (API) such as Representational State Transfer (REST) API. Furthermore, the processor 109 may validate the learning model using a simulated environment created by network service providers associated with the one or more network nodes 103 at regular intervals, upon receiving a trigger from the CCM 105. Based on result of the validation, the processor 109 may rebuild the learning model.

FIG. 2 shows a detailed block diagram of a training data generation system for generating synchronized labelled training dataset for building a learning model in accordance with some embodiments of the present disclosure.

In some implementations, the training data generation system 107 may include data 203 and modules 205. As an example, the data 203 is stored in the memory 113 configured in the training data generation system 107 as shown in the FIG. 2. In one embodiment, the data 203 may include timing parameter data 207, network Key Performance Indicators (KPI) data 209, user experience data 211, synchronized labelled training dataset 213, model data 215, validation data 217 and other data 225. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 225 may store data, including temporary data and temporary files, generated by the modules 205 for performing the various functions of the training data generation system 107.

In some embodiments, the timing parameter data 207 may include, but not limited to, timing parameters related to a User Equipment (UE) 101 and the timing parameters related to one or more network nodes 103. As an example, the timing parameters related to the UE 101 may include, but not limited to, Round trip time between a processor 109 of the training data generation system 107 and the UE 101 ($RTT_{UE}$) for receiving the user experience data 211. As an example, the timing parameters related to the one or more network nodes 103 may include, but not limited to, Round trip time between the processor 109 and the one or more network nodes 103 ($RTT_{NN}$) for receiving the network Key Performance Indicators (KPI) data 209, predefined sample intervals ($\Delta T_{CI}$) and timestamp of network KPI records per sample ($T_{KPIN(i)}, T_{KPIN(i+1)}, - - - T_{KPIN(i+n)}$).

In some embodiments, the network KPI data 209 may include, but not limited to, type of network KPIs and corresponding data types, network node layer Identifier (ID), network KPI record count per sample, network KPI values, predefined sample intervals and timestamp of network KPI records. In some embodiments, contents of the network KPI data 209 may be decided based on a metadata model configured by a Central Configuration Manager (CCM) 105 associated with the training data generation system 107. The CCM 105 may communicate the metadata model of the network KPI data 209 to the training data generation system 107 based on which the training data generation system 107 may communicate with the one or more network nodes 103.

As an example, the network node Layer ID in case of evolved NodeB (eNodeB), may be a layer entity corresponding to Layer 1, Layer 2, Layer 3, or upper layer protocols like Internet Protocol (IP), Transmission Control Protocol (TCP)/User Datagram Protocol (UDP) and Application layer protocols like Real-Time Transport Protocol (RTP)/Real Time Streaming Protocol (RTSP), Session Initiation Protocol (SIP) and the like. In some embodiments, each layer could have further sub-layers. As an example, Long-Term Evolution (LTE) wireless L2 protocol may have sub-layers such as Media Access Control (MAC), Radio Link Control (RLC) and Packet Data Convergence Protocol (PDCP).

As an example, consider a scenario where the user is consuming a multimedia content on the UE 101. The network KPIs associated with L2 protocol layers may be considered for this scenario, since the network KPIs of the L2 protocol layers may affect quality of the multimedia content consumed on the UE 101, which in turn affect user experience. As an example, the network KPIs associated with the L2 protocol layers are as shown in the below Table 1, Table 2 and Table 3.

TABLE 1

| Protocol | Key Performance Indicators (KPIs) |
|---|---|
| MAC layer | Number of Successful Random-Access Channel (RACH) |
| | Number of Failed RACH |
| | Number of Active UE Radio Network Temporary Identifier (RNTI) |
| | Number of Active Data Radio Bearer (DRB) |
| | Physical Resource Block (PRB) Usage |
| | QoS Class Identifier (QCI) |
| | Hybrid Automatic Repeat Request (HARQ) Retransmission |
| | Channel Quality Indicator (CQI) |
| | Packet Scheduling Rate |
| | Deficiency to achieve Guaranteed Bit Rate |
| | Modulation Scheme |
| | Packet Drop in Download Link (DL)/Upload Link (UL) over the Air |

TABLE 2

| Protocol | Key Performance Indicators (KPIs) |
|---|---|
| RLC Layer | RLC Mode—Acknowledged Mode (AM)/Unacknowledged Mode (UM) |
| | RLC Protocol Data Unit (PDU) Arrival Rate in UL/DL |
| | Throughput of RLC Service Data Unit (SDU)/PDCP Buffer in DL |
| | RLC SDU Delay in DL |
| | RLC PDU Discard Packet in UL |
| | RLC Retransmission Analysis |
| | Total number of Received RLC PDU in UL |

TABLE 3

| Protocol | Key Performance Indicators (KPIs) |
|---|---|
| PDCP Layer | PDCP SDU Arrival Rate in UL |
| | PDCP SDU Arrival Rate in DL |
| | PDCP SDU Drop in DL at eNodeB |
| | Air Interface PDCP SDU Loss in UL |
| | Total number of Received PDCP SDU in DL |
| | Total number of Received PDCP SDU in UL |

Further, the user experience while consuming the multimedia content on the UE 101 may be affected majorly due to network parameters such as bandwidth, latency and jitter. As an example, the network KPIs related to the network parameters, from the L2 protocol layers that majorly affect the network parameters such as bandwidth, latency and jitter are as listed below:

Bandwidth:
1. MAC: Number of Active UEs
2. MAC: PRB usage
4. MAC: QCI
5. MAC: Modulation scheme
6. MAC: Packet Scheduling Rate
7. RLC: Throughput of RLC SDU/PDCP PDU Buffer in DL/UL
8. PDCP: SDU Drop in DL/UL at eNodeB Latency:
1. MAC: HARQ
2. MAC: Modulation Scheme
3. RLC: SDU delay in DL
4. MAC: PRB usage
5. PDCP: PDU Arrival Rate in DL
6. PDCP SDU Drop in DL/ULat eNodeB Jitter:
1. MAC: HARQ
2. MAC: Modulation Scheme
3. RLC: SDU delay in DL
4. MAC: PRB usage
5. PDCP: PDU Arrival Rate in DL
6. PDCP SDU Drop in DL/ULat eNodeB Further, the network KPI record count per sample may represent number of KPI records collected in one network KPI sample. As an example, consider that, the network KPI record collection rate is 1 record per second. Therefore, a predefined sample interval of 1 min may include 60 network KPI records.

Further, the predefined sample intervals may represent time interval between collection of two successive network KPI data 209 samples. Furthermore, the metadata model of the network KPI data 209 may define one or more messages that enable the training data generation system 107 to communicate with the one or more network nodes 103. As an example, the one or more messages may include, but not limited to, SYNC.REQ, SYNC.RES, KPI.REQ, KPI.RES, NODE.REQ and NODE.RES. In some embodiments, message structure of the one or more messages may be as shown below.

| NODE ID | Payload |
| --- | --- |

The field "Payload" may differ for each of the one or more messages. As an example, for the message "KPI.RES", the field "Payload" may include the network KPI data 209 collected by the one or more network nodes 103 in accordance with the metadata model configured by the CCM 105. As an example, for the message "NODE.RES", the field "Payload" may include timestamps associated with reception of the message "NODE.REQ" ($T_{NNR}$), transmission of the message "NODE.RES" ($T_{NNS}$) and collection of the network KPI data 209 ($T_{KPIN}$).

In some embodiments, the user experience data 211 may include, but not limited to, UE Identifier (ID), multimedia content type, predefined sample intervals, Mean Opinion Score (MOS), timestamp of the MOS and a label type. In some embodiments, content of the user experience data 211 may be decided based on a metadata model configured by the CCM 105. The CCM 105 may communicate the metadata model of the user experience data 211 to the training data generation system 107 based on which the training data generation system 107 may communicate with the UE 101.

As an example, the UE-ID may uniquely identify the UE 101. Further, the multimedia content type may indicate type of multimedia content being consumed on the UE 101. As an example, the multimedia content type may include, but not limited to, video and audio. Further, the predefined sample intervals represent time interval between collection of two successive user experience data 211 samples. Further, the MOS value may be a numerical representation of the user experience while consuming the multimedia content. Furthermore, the label type may indicate one or more labels used for specifying a certain action associated with the UE 101. As an example, Video Start (VS) may be a label type used for triggering start of playback of the multimedia content in the UE 101. Further, as an example, Video End (VE) may be a label type used for triggering end of playback of the multimedia content in the UE 101.

In some embodiments, the synchronized labelled training dataset 213 may include the user experience data 211 correlated with the network KPI data 209. Further, the synchronized labelled training dataset 213 may include, timestamp corresponding to collection of the user experience data 211 and the network KPI data 209.

In some embodiments, the model data 215 may include a learning model built based on the synchronized labelled training dataset 213. Further, a rebuilt learning model created after validation session of the learning model may also be stored as the model data 215.

In some embodiments, validation data 217 may include, but not limited to, $MOS_{REF}$ values received from the UE 101 and $MOS_{PRED}$ values received from an external analytics system 115 associated with the training data generation system 107, during the validation session. In some embodiments, MOS obtained from the UE 101 as part of a validation dataset during the validation session, may be referred as $MOS_{REFERENCE}$ or $MOS_{REF}$. In some embodiments, MOS predicted by the external analytics system 115 may be referred as $MOS_{PREDICTED}$ or $MOS_{PRED}$. Further, the validation dataset generated during validation session may also be stored as the validation data 217. In some embodiments, contents of the validation dataset generated during the validation session may be similar to contents of the synchronized labelled training dataset 213 generated during training.

In some embodiments, the data 203 stored in the memory 113 may be processed by the modules 205 of the training data generation system 107. The modules 205 may be stored within the memory 113. In an example, the modules 205 communicatively coupled to the processor 109 configured in the training data generation system 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a determining module 233, a time synchronization module 235, a receiving module 237, a quality evaluating module 239, a data correlating module 241, a model building module 243, a model validating module 245 and other modules 247. The other modules 247 may be used to perform various miscellaneous functionalities of the training data generation system 107. It will be appreciated that such aforementioned modules 205 may be represented as a single module or a combination of different modules.

In some embodiments, the determining module 233 may determine timing parameters related to the UE 101 capable of receiving a multimedia content and timing parameters related to one or more network nodes 103 used to facilitate streaming of the multimedia content to the UE 101. In some embodiments, the timing parameters related to the UE 101 and the one or more network nodes 103 may be determined in a simulated environment. In some other embodiments, the timing parameters related to the UE 101 and the one or more network nodes 103 may be determined in a real-time environment.

In some embodiments, the determining module 233 may determine the timing parameters related to the UE 101 and the one or more network nodes 103 using the one or more messages preconfigured in the memory 113. As an example, the one or more messages may include, but not limited to, SYNC.REQ, SYNC.RES, KPI.REQ, KPI.RES, NODE.REQ and NODE.RES. Exemplary illustration of determining the timing parameters related to the UE 101 is shown in the FIG. 2B.

Figure 2A:
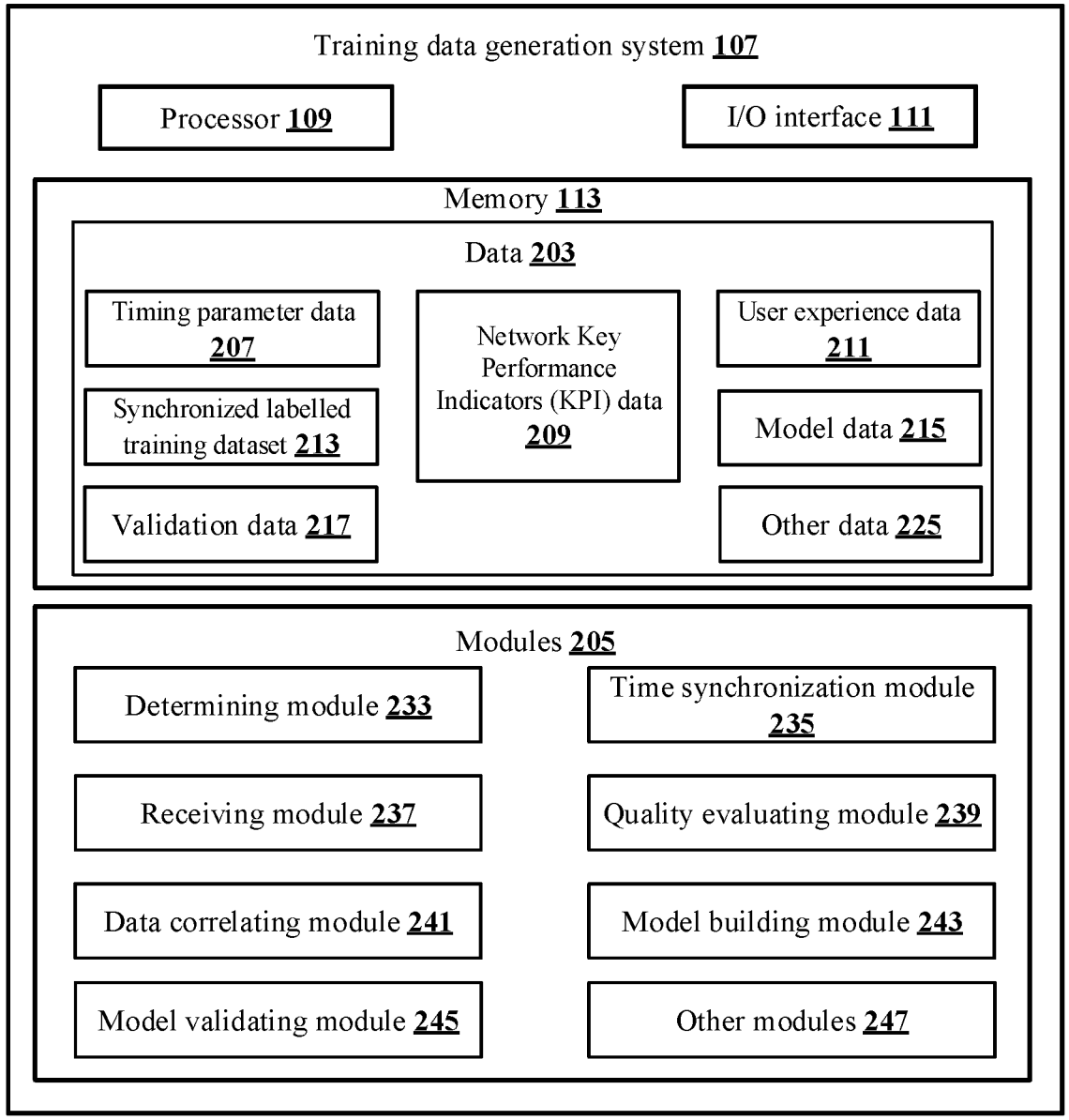
FIG. 2A shows a detailed block diagram of a training data generation system for generating synchronized labelled training dataset for building a learning model in accordance with some embodiments of the present disclosure.
Figure 2B:
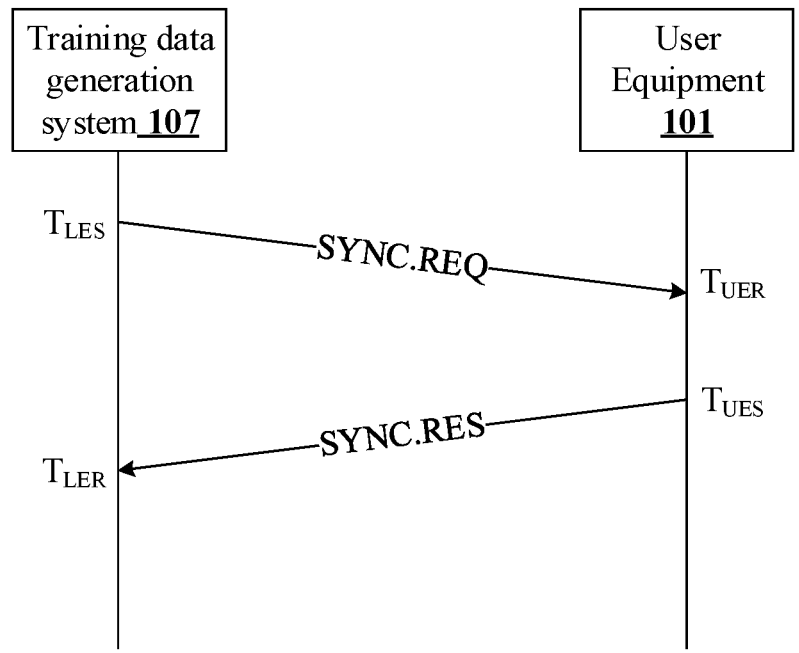
FIG. 2B-FIG. 2E show sequence diagrams to illustrate determination of timing parameters for achieving time synchronization in accordance with some embodiments of the present disclosure.

As shown in the FIG. 2B, the determining module 233 may transmit a SYNC.REQ message to the UE 101 and receives a SYNC.RES message from the UE 101. The determining module 233 determines the timing parameters related to the UE 101 based on the exchange of the SYNC.REQ and SYNC.RES messages. The determining module 233 may record timestamp when the SYNC.REQ message is transmitted to the UE 101 ($T_{LES}$) and timestamp when the SYNC.RES message is received from the UE 101 ($T_{LER}$). Based on the recorded timestamps, the determining module 233 may determine the Round trip time between the training data generation system 107 and the UE 101 ($RTT_{UE}$) for receiving user experience data, using the below Equation 1.

$$RTT_{UE} = T_{LER} - T_{LES} \quad \text{Equation 1}$$

Figure 2C:
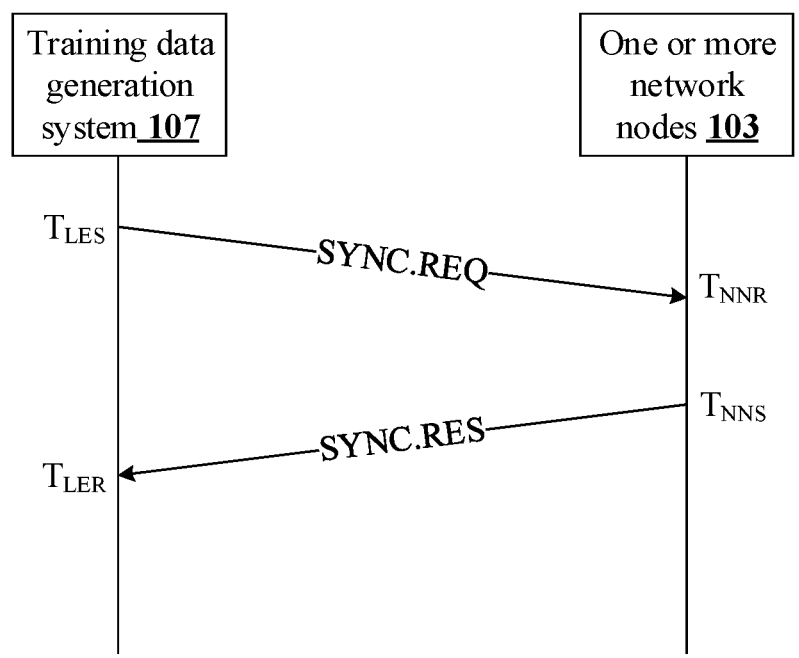

Exemplary illustration of determining the timing parameters related to the one or more network nodes 103 i.e. Round trip time for receiving network KPI data is shown in the FIG. 2C.

As shown in the FIG. 2C, the determining module 233 may transmit a SYNC.REQ message to the one or more network nodes 103 and receives a SYNC.RES message from the one or more network nodes 103. The determining module 233 determines the timing parameters related to the one or more network nodes 103 based on the exchange of the SYNC.REQ and SYNC.RES messages. The determining module 233 may record timestamp when the SYNC.REQ message is sent to the one or more network nodes 103 ($T_{LES}$) and timestamp when the SYNC.RES message is received from the one or more network nodes 103 ($T_{LER}$). Based on the recorded timestamp, the determining module 233 may determine the Round trip time between the training data generation system 107 and the one or more network nodes 103 ($RTT_{NN}$) for receiving network KPI data, using the below Equation 2.

$$RTT_{NN} = T_{LER} - T_{LES} \quad \text{Equation 2}$$

Figure 2D:
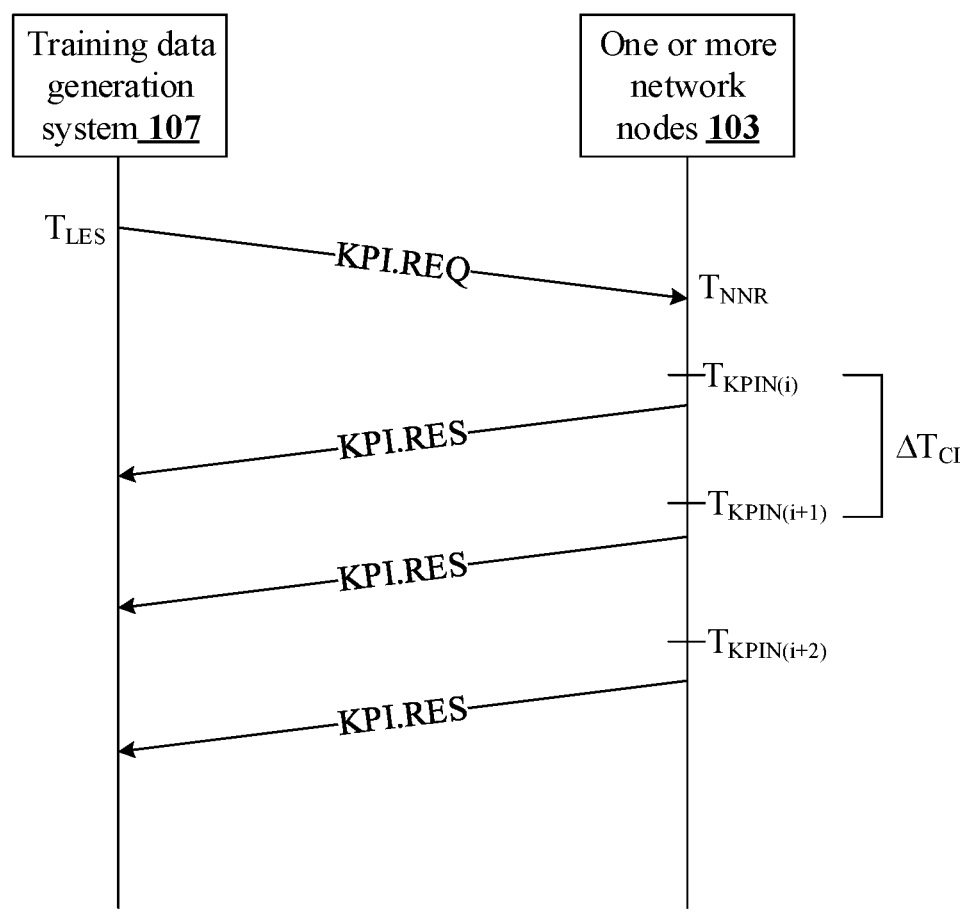
Figure 2E:
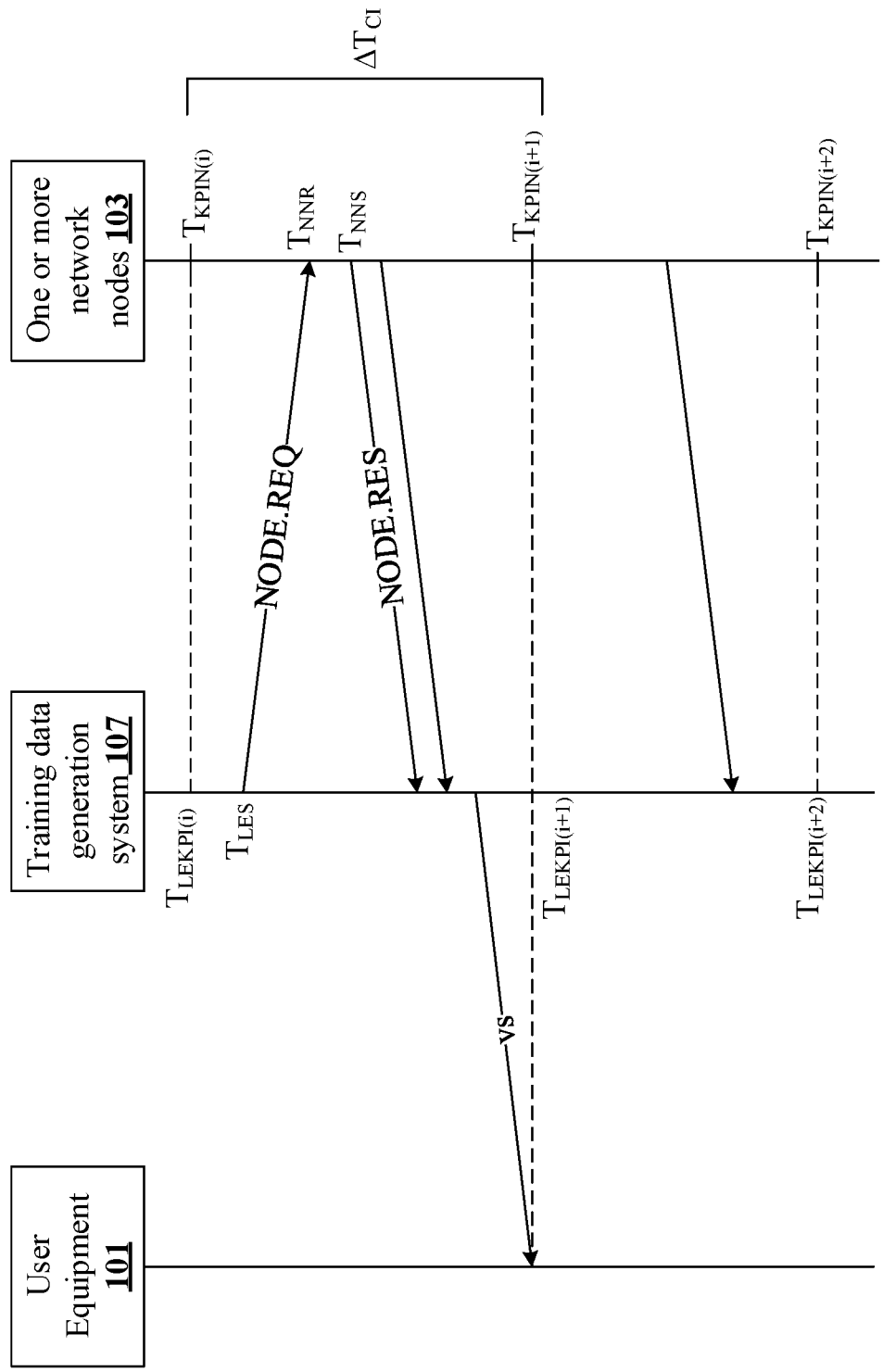

Exemplary illustration of determining the timing parameters related to the one or more network nodes 103 i.e. timestamp of network KPI records per sample and sample intervals is shown in the FIG. 2D and FIG. 2E.

As shown in the FIG. 2D, the determining module 233 may transmit a KPI.REQ message to the one or more network nodes 103 and may receive KPI.RES message from the one or more network nodes 103 at different time intervals. In some embodiments, the KPI.RES message trigger the one or more network nodes 103 to collect the network KPI data 209 at different time intervals for a sample and to transmit the network KPI data 209 to the determining module 233.

Further, as shown in the FIG. 2E, the determining module 233 may transmit a NODE.REQ message to the one or more network nodes 103 and receives a NODE.RES message from the one or more network nodes 103. The determining module 233 determines the timing parameters related to the one or more network nodes based on the exchange of the NODE.REQ and NODE.RES messages. The NODE.RES message may provide timestamp when the one or more network nodes 103 received the NODE.REQ message ($T_{NNR}$), timestamp when the one or more network nodes 103 transmitted the NODE.RES message to the UE 101 ($T_{NNS}$) and the timestamp of network KPI samples at the one or more network nodes ($T_{KPIN}(i)$, $T_{KPIN}(i+1)$, - - - $T_{KPIN}(i+n)$). Further, the determining module 233 may determine different sample intervals ($\Delta T_{CI}$) by computing difference between subsequent timestamps of the network KPI record.

Upon determining the timing parameters related to the UE 101 and the timing parameters related to the one or more network nodes 103, the determining module 233 may determine a timing advance factor ($\Delta T_{LEA}$) based on the determined timing parameters related to the UE 101 and the one or more network nodes 103. In some embodiments, the timing advance factor may be defined as amount of time prior to which the processor 109 may signal the UE 101 to initiate playback of multimedia content in the UE 101. In some embodiments, the timing advance factor may compensate latency between the processor 109, the UE 101, and the one or more network nodes 103, by tuning respective independent clocks to clock of the training data generation system 107. Further, the timing advance factor is a runtime variable, therefore, in some embodiments, the determining module 233 may determine the timing advance factor before collection of each network KPI sample.

In some embodiments, the processor 109 may determine the timing advance factor based on the following Equations. As an example, consider a $T_{KPIN}$ for an $i^{th}$ instant.

$$T_{LEKPI}(i) = [T_{LER} - (RTT_{NN}/2)] - [T_{NNS} - T_{KPIN}(i)] \quad \text{Equation 3}$$

$$T_{LEKPI}(i+1) = T_{LEKPI}(i) + \Delta T_{CI} \quad \text{Equation 4}$$

$$T_{LEA} = T_{LE} + (RTT_{UE}/2) \quad \text{Equation 5}$$

In the above Equation 3, $T_{LEKPI}(i)$ indicates timestamp determined by the processor 109 which is equivalent to timestamp at the one or more network nodes for the $i^{th}$ instant ($T_{KPIN}(i)$).

In the above Equation 4,

TLEKPI(i+1) indicates timestamp determined by the processor 109 which is equivalent to timestamp at the one or more network nodes for the i+1th instant (TKPIN(i+1)).

In the above Equation 5, $T_{LE}$ indicates current timestamp of the training data generation system 107.

In some embodiments, the time synchronization module 235 may achieve time synchronization between the processor 109, the one or more network nodes 103 and the UE 101, by signaling the UE 101 to initiate playback of the multimedia content based on the timing advance factor. The processor 109 may signal the UE 101 based on the below mentioned conditions related to the timing advance factor.

if ($T_{LEA} < T_{LEKPI}(i+1)$):

Processor 109 may send Video Start (VS) signaling command to the UE 101 else:

$$T_{Next} = T_{LEKPI}(i+2) - (RTT_{UE}/2)$$

Processor 109 may send VS signaling command in the interval $T_{LEKPI}(i+1) < T_{Next} < T_{LEKPI}(i+2)$ In the above mentioned conditions, $T_{Next}$ indicate a next timestamp at which the VS signaling command could be sent to the UE 101.

$T_{LEKPI}(i+2)$ indicates timestamp determined by the processor 109 which is equivalent to timestamp at the one or more network nodes for the $i+2^{nd}$ instant ($T_{KPIN}(i+2)$).

An exemplary illustration of sending the VS signalling command to the UE 101 is as shown in the FIG. 2E.

In some embodiments, the receiving module 237 may receive the network KPI data 209 from the one or more network nodes 103 and the user experience data 211 from the UE 101, concurrently, for the streamed multimedia content. The receiving module 237 may receive the network KPI data 209 and the user experience data 211 at the predefined sample intervals, while the multimedia content is being consumed on the UE 101.

In some embodiments, the network KPI data 209 received by the receiving module 237 may be in accordance with the metadata model of the network KPI data 209, configured by the CCM 105. In some embodiments, the one or more network nodes 103 may collect a set of different network KPIs in each record based on the configuration determined by the CCM 105. Further, the network KPI data 209 may be collected by the one or more network nodes 103 for different network conditions. However, there may be practical difficulties to collect the network KPI data 209 from live field scenarios. Therefore, in some embodiments, a lab network may be utilized to simulate different network conditions for capturing the network KPI data 209, while the multimedia content is being consumed on the UE 101. As an example, in one simulation approach, a backhaul occupancy condition may be simulated by generating varying levels of network traffic at regular intervals on S1-u interface between the eNodeB and Service Gateway (S-GW). As an example, in another simulation approach, the UE 101 may be moved away from the eNodeB at regular intervals to simulate varying user mobility patterns.

An exemplary record of network KPI data 209 is as shown below:

Network node layer ID—Layer 2
Type of network KPI—MAC protocol—Number of Successful RACH
  Number of Failed RACH
  Number of Active UE (RNTI)
  Number of Active Data Radio Bearer (DRB)
  Packet Scheduling Rate
Network KPI record per sample: 60
Predefined sample interval: 1 minute
Timestamp of network KPI records:

| Type of Network KPI | Value | Timestamp |
| --- | --- | --- |
| Number of Successful RACH | — | 15:00:45 |
| Number of Failed RACH | — | 15:00:46 |
| Numberof Active UE (RNTI) | — | 15:00:47 |
| Number of Active Data Radio Bearer (DRB) | — | 15:00:48 |
| Packet Scheduling Rate | — | 15:00:49 |

In some embodiments, the user experience data 211 received by the receiving module 237 may be in accordance with the metadata model of the user experience data 211, configured by the CCM 105. Further, the UE 101 may determine MOS, which indicates the user experience, in two different techniques. However, this should not be considered as a limitation in the present disclosure, as other techniques could be used by the UE 101 to determine the MOS. In some embodiments, the UE 101 may be configured with an application that may act as an active probe in the background, to collect the MOS in real-time.

In some embodiments, the first technique may be a manual entry of the MOS by a user of the UE 101. As an example, the user may be a Subject Matter Expert (SME). In this technique, the user may pre-configure the application to prompt the user at the predefined sample intervals. When the UE 101 prompts the user, the user may determine the MOS based on subject matter knowledge and manually enter the MOS in the application. The manually entered MOS may be encoded into a message and transmitted from the UE 101 to the receiving module 237 via a communication network. Further, the user may be prompted at the predefined sample intervals to manually enter the MOS for the multimedia content being consumed on the UE 101. In some embodiments, the MOS may be determined from a scale of 1 to 5. However, this technique of manually determining the MOS may be possible only when the user of the UE 101 is the SME. Therefore, the present disclosure discloses another technique that automatically determines the MOS. In some embodiments, the UE 101 may be configured with a model that works based on deep learning techniques to predict MOS in real-time, for the multimedia content being consumed on the UE 101. The model may run in the background to predict the MOS in real-time by analyzing pixel information in frames of the multimedia content. At the predefined sample intervals, the model configured in the UE 101 may predict the MOS and store the MOS in a format specified by the CCM 105 in the metadata model, along with the timestamp and UE-ID.

In both the techniques, the MOS determination may start when the time synchronization module 235 signals the UE 101 to initiate the playback of the multimedia content. Further, in both the techniques, the MOS determination may end when the processor 109 transmits the VE command to the UE 101.

An exemplary record of user experience data 211 is as shown below.
  Multimedia content type: Video
  Label type: VS
  MOS: 3
  Timestamp: 15:22:19
  UE-ID: 58183

In some embodiments, MOS is directly proportional to the user experience i.e. higher the MOS, higher the user experience and vice-versa.

In some embodiments, the quality evaluating module 239 may evaluate the quality of the user experience data 211 obtained from the UE 101. In some embodiments, there may be scenarios where the MOS obtained from the UE 101 may be low, though the network conditions are strong. Therefore, in such scenarios, the user experience may be affected based on the streaming server used for streaming the multimedia content to the UE 101. The quality evaluating module 239 may evaluate the quality of the user experience data 211 to ensure that MOS obtained from the UE 101 corresponds to the network conditions associated with the one or more network nodes 103 that enable streaming of the multimedia content to the UE 101, at that instant when the MOS is recorded.

In some embodiments, the quality evaluating module 239 may determine a transmission rating factor (R) based on one or more network parameters while streaming of the multimedia content to the UE 101. As an example, the one or more network parameters may include, but not limited to, bandwidth, latency, jitter and network KPIs associated with the streaming of the multimedia content to the UE 101. In some embodiments, the quality evaluating module 239 may use an E-model for determining the transmission rating factor. Further, the quality evaluating module 239 may determine the MOS based on value of the transmission rating factor (R) using the Table 4. In the context of the present disclosure, the MOS determined based on the transmission rating factor (R) may be indicated as $MOS_R$.

TABLE 4

| Range of E-model Rating R | Quality | User experience |
| --- | --- | --- |
| 90 ≤ R < 100 | Best | Very satisfied |
| 80 ≤ R < 90 | High | Satisfied |
| 70 ≤ R < 80 | Medium | Some users dissatisfied |
| 60 ≤ R < 70 | Low | Many users dissatisfied |
| 50 ≤ R < 60 | Poor | Nearly all users dissatisfied |

As an example, consider that the transmission rating factor (R) is 95. Therefore, by mapping the transmission rating factor with the Table 4, the quality evaluating module 239 may determine that the transmission rating factor corresponds to the quality "best" and user experience "Very satisfied". Therefore, on a scale of 1 to 5, the $MOS_R$ may be determined as 5 for the determined user experience corresponding to the transmission rating factor based on the Table 4.

Upon determining $MOS_R$, the quality evaluating module 239 may determine true quality of the multimedia content using the Equation 6 as shown below.

$$\text{True quality of the multimedia content (TQ)} = (MOS_{CNN} + (5-MOS_R))) \quad \text{Equation 6}$$

In the above Equation 6, $MOS_{CNN}$ represents the MOS received from the UE 101, which is determined using deep learning techniques i.e. one of the two techniques mentioned above;

MOSR represents the MOS determined by the quality evaluating module 239 based on the transmission rating factor (R); and 5-MOSR represents MOS impairment caused by the network conditions.

Further, the quality evaluating module 239 may evaluate quality of the user experience data 211 received from the UE 101, to determine usability of the user experience data 211 for building a learning model. In some embodiments, the quality evaluation may be performed prior to correlating the user experience data 211 with the network KPI data 209. If the quality evaluating module 239 determines the user experience data 211 received from the UE 101 to be not usable for building the learning model, the user experience data 211 may be discarded.

In some embodiments, to evaluate the quality of the user experience data 211, the quality evaluating module 239 may consider Equation 6 i.e. $MOS_{CNN}$, $MOS_R$ and $5\text{-}MOS_R$. In some embodiments, the quality of the user experience data 211 may be evaluated under the following 4 conditions.

1. The multimedia content quality at streaming source is bad, but network conditions are good.

Under this condition, the $MOS_{CNN}$ may be low since the user experience while consuming the multimedia content may be low/dissatisfied. However, the $MOS_R$ may be high since the network conditions are good. Therefore, the impairment due to network conditions i.e. $5\text{-}MOS_R$ may be low, thereby indicating that the network condition is not a substantive reason under this condition for the dissatisfied user experience while consuming the multimedia content. Further, the quality evaluating module 239 may infer that the dissatisfied user experience while consuming the multimedia content may be due to bad quality of the multimedia content being streamed from the streaming source, but not due to the network conditions. Therefore, $MOS_{CNN}$ received from the UE 101 under this condition, may not be used for building the learning model, since the learning model may be built only based on varying network conditions that affect the user experience.

As an example, consider the following values for this condition:

$MOS_{CNN}=2$ $MOS_R=4$ $5\text{-}MOS_R=1$

The above example indicates that the level of impairment caused due to the network conditions is 1, which is considered to be low. At the same time, the $MOS_R$ is high when compared to the $MOS_{CNN}$, which proves that the quality of the multimedia content is low. Therefore, the $MOS_{CNN}$ value may not be usable for building the learning model.

2. The multimedia content quality at streaming source is bad, and network conditions are also bad.

Under this condition, the $MOS_{CNN}$ may be low since the user experience while consuming the multimedia content may be low/dissatisfied. However, the $MOS_R$ may also be low since the network conditions are bad. Therefore, the impairment due to network conditions i.e. $5\text{-}MOS_R$ may be high, thereby indicating that the network condition may be a substantive reason under this condition for the dissatisfied user experience while consuming the multimedia content. However, since the $MOS_{CNN}$ value is also low, the quality evaluating module 239 may infer that the dissatisfied user experience while consuming the multimedia content may be due to bad quality of the multimedia content being streamed from the streaming source, as well as the network conditions. Therefore, $MOS_{CNN}$ received from the UE 101 under this condition also may not be used for building the learning model, since the learning model may be built only based on varying network conditions that affect the user experience.

As an example, consider the following values for this condition:

$MOS_{CNN}=2$ $MOS_R=2$ $5\text{-}MOS_R=3$

The above example indicates that the level of impairment caused due to the network conditions is 3, which is considered to be high. At the same time, the $MOS_R$ is as low as the $MOS_{CNN}$, which proves that along with the network conditions, the quality of the multimedia content is also low. Therefore, the $MOS_{CNN}$ value may not be usable for building the learning model.

3. Similarly, when the multimedia content quality at streaming source is good, and network conditions are good, the quality evaluating module 239 may determine that the $MOS_{CNN}$ value may be usable for building the learning model.

4. Similarly, when the multimedia content quality at streaming source is good, and network conditions are bad, the quality evaluating module 239 may determine that the $MOS_{CNN}$ value may be usable for building the learning model.

In some embodiments, the data correlating module 241 may correlate the user experience data 211 with the corresponding network KPI data 209, based on timestamp corresponding to the user experience data 211 and the network KPI data 209, to generate the synchronized labelled training dataset 213. An exemplary

TABLE 5

| UE-ID | $T_{KPIN}$ | $T_{LE}$ | $T_{UE}$ | RLC_buff_throughput_dl | MAC_scheduling_rate | ... | MAC_no_of_ota_pdu_drop_dl | MOS |
|---|---|---|---|---|---|---|---|---|
| 58153 | 1688152 | 1688172 | 1688182 | | | ... | | 3 |
| 58153 | 1690153 | 1690173 | 1690183 | | | ... | | 3 |
| 58153 | 1692153 | 1692173 | 1692183 | | | ... | | 3 |
| 58153 | 1694153 | 1694173 | 1694183 | | | ... | | 2 |
| 58153 | 1696153 | 1696173 | 1696183 | | | ... | | 2 | synchronized labelled training dataset 213 is shown in the below Table 5.

In the above Table 5,

UE-ID indicates unique identifier of the UE 101;

$T_{KPIN}$ indicates timestamp of the network KPI data 209 sample i.e. timestamp at the one or more network nodes 103 when the network KPI sample data was collected;

$T_{UE}$ indicates timestamp of the user experience data 211 sample i.e. timestamp at the UE 101 when the user experience data 211 sample was collected;

$T_{LE}$ indicates current timestamp of the training data generation system 107;

MOS indicates the user experience collected as part of the user experience data 211; and The remaining columns with headings such as RLC_buff_throughput_dl, MAC_scheduling_rate, MAC_no_of_ota_pdu_drop_dl and the like indicate various network KPIs collected as part of the network KPI data 209.

In some embodiments, the model building module 243 may build the learning model based on the synchronized labelled training dataset 213. In some embodiments, the model building module 243 may use one or more predefined model building technique to build the learning model. The model building module 243 may initially perform data pre-processing on the synchronized labelled training dataset 213. As part of the data pre-processing, the synchronized labelled training dataset 213 may be analyzed and processed to detect outliers, and further normalized. In some embodiments, when the synchronized labelled training dataset 213 is skewed, the model building module 243 may perform over-sampling/under-sampling to make the synchronized labelled training dataset 213 sufficiently homogeneous.

Further, in some embodiments, the model building module 243 may perform feature engineering on the synchronized labelled training dataset 213 that was previously processed, to identify relevant features that enable detection of the user experience data 211. In some embodiments, the one or more predefined model building techniques used for performing feature engineering may include, but not limited to, cross-correlation matrix technique and box-plot analysis.

Further, in some embodiments, the model building module 243 may perform classifier training and validation for detection of the user experience data 211. In some embodiments, the model building module 243 may use classifiers such as decision tree, multinomial logistic regression, support vector machine and the like, that are trained based on the synchronized labelled training dataset 213. The model building module 243 may select best classifier for performing classifier training, based on parameters such as accuracy, recall and precision.

In some embodiments, the model building module 243 may deploy the learning model built by performing the steps of data pre-processing, feature engineering and classifier training as mentioned above, into the external analytics system 115. In some embodiments, the model building module 243 may use Application Programming Interface (API) such as Representational State Transfer (REST) API to deploy the learning model into the external analytics system 115. In some embodiments, the learning model deployed into the external analytics system 115 may act as a non-intrusive passive probe to predict real-time user experience, without intruding into the UE 101, thereby sustaining privacy of the user.

In some embodiments, the model validating module 245 may validate predictions of the learning model deployed in the external analytics system 115 at regular intervals configured by the CCM 105 as part of a rebuilding criteria of the learning model. In some embodiments, the learning model deployed in the external analytics system 115 may not provide accurate predictions of the real-time user experience, though the learning model was built based on synchronized labelled training dataset 213 of high quality. In such scenarios, the predictions of the external analytics system 115 may not be accurate due to occurrence of seasonality issues in the one or more network nodes 103 that in turn affect relationship between the network KPI data 209 and the user experience data 211. As an example, the seasonality issues may include, but not limited to, congestion rate of transmission links of the one or more network nodes 103, varying traffic patterns, traffic load, user mobility patterns, environmental conditions such as free space, humidity, vegetation, buildings for radio frequency propagation, dielectric condition of fiber optic media, and the like, that influence behavior of transmission media, and related parameters that affect the network KPIs directly or indirectly.

In some embodiments, to validate the predictions of the external analytics system 115, a network service provider associated with the training data generation system 107 may simulate the use case for which the learning model was built. As mentioned at the beginning of the detailed description, the present disclosure is described specific to the use case that involves improving user experience when the user is accessing multimedia content streamed on the UE 101 via the one or more network nodes 103. Upon simulating the use case, the model validating module 245 may determine the timing advance factor to achieve time synchronization, receive the user experience data 211 and the network KPI data 209, and correlate the user experience data 211 and the network KPI data 209 to obtain a validation dataset, by triggering respective modules that are explained above in detail. In some embodiments, contents of the validation dataset obtained at the validation stage may be similar to the contents of the synchronized labelled training dataset 213. In some embodiments, the MOS obtained as part of the validation dataset may be referred as $MOS_{REFERENCE}$ or $MOS_{REF}$.

Simultaneously, the external analytics system 115 deployed with a previously built learning model, may perform real-time prediction of the user experience for the multimedia content being consumed on the UE 101. The MOS predicted by the external analytics system 115 may be referred as $MOS_{PREDICTED}$ or $MOS_{PRED}$. In some embodiments, the $MOS_{REF}$ and the $MOS_{PRED}$ values, along with the validation dataset may be stored as the validation data 217.

In some embodiments, the model validating module 245 may determine a standard deviation between samples of the $MOS_{REF}$ and the $MOS_{PRED}$ values using the below mention Equation 7.

$$\sigma = \sqrt{\frac{1}{N}\sum_{i=1}^{N}(MOS\text{ reference}(i) - MOS\text{ predicted}(i))^2} \quad \text{Equation 7}$$

In the above Equation 7,
σ indicates the standard deviation between the samples of the $MOS_{REF}$ and the $MOS_{PRED}$ values;
i indicates a sample instant; and
N indicates total number of samples, in other words, maximum $i^{th}$ value.

As an example, consider that the $MOS_{REF}$ and $MOS_{PRED}$ values are determined for 1000 samples in one validation session. Therefore, the Equation 7 for 1000 samples would be as shown below:

$$\sigma = \sqrt{\frac{1}{1000}\sum_{i=1}^{1000}(MOS\text{ reference}(i) - MOS\text{ predicted}(i))^2}$$

Further, the below Table 6 illustrates an exemplary report including $MOS_{REF}$ and $MOS_{PRED}$ values determined for 1000 samples in one validation session.

TABLE 6

| Value of i | $MOS_{REF}$ | $MOS_{PRED}$ | Standard deviation (σ) |
|---|---|---|---|
| 1 | $MOS_{REF\,(1)}$ = 2 | $MOS_{PRED\,(1)}$ = 2 | |
| 2 | $MOS_{REF\,(2)}$ = 3 | $MOS_{PRED\,(2)}$ = 3 | |
| 3 | $MOS_{REF\,(3)}$ = 3 | $MOS_{PRED\,(3)}$ = 4 | |
| 4 | $MOS_{REF\,(4)}$ = 5 | $MOS_{PRED\,(4)}$ = 5 | |
| 5 | $MOS_{REF\,(5)}$ = 4 | $MOS_{PRED\,(5)}$ = 4 | |
| 6 | $MOS_{REF\,(6)}$ = 4 | $MOS_{PRED\,(6)}$ = 4 | |
| 7 | $MOS_{REF\,(7)}$ = 3 | $MOS_{PRED\,(7)}$ = 3 | |
| 8 | $MOS_{REF\,(8)}$ = 2 | $MOS_{PRED\,(8)}$ = 4 | |
| 9 | $MOS_{REF\,(9)}$ = 2 | $MOS_{PRED\,(9)}$ = 2 | |
| ... | ... | ... | |
| ... | ... | ... | |
| 1000 | $MOS_{REF\,(1000)}$ = 4 | $MOS_{PRED\,(1000)}$ = 4 | |

In some embodiments, when the standard deviation is zero, the model validating module 245 may provide a positive result indicating that the user experience predicted by the learning model deployed in the external analytics system 115 is accurate. In some embodiments, when the standard deviation is any value greater than zero, the model validating module 245 may provide a negative result indicating that the user experience predicted by the learning model deployed in the external analytics system 115 is not accurate.

Further, in some embodiments, the model validating module 245 may compute a percentage value of the standard deviation. As an example, if the standard deviation is 0.2123, the percentage value of the standard deviation may be 21.23%. Furthermore, the model validating module 245 may perform the validation process for substantive number of validation session preconfigured by the CCM 105. If the percentage value of the standard deviation for each of the validation sessions is determined to be greater than 10%, then the result of the validation may be treated as negative and the CCM 105 may trigger the model building module 243 to rebuild the learning model.

In some embodiments, the model building module 243 may concatenate the current user experience data and current network KPI data, obtained as part of the validation dataset, to the synchronized labelled training dataset 213, that was previously used by the model building module 243 for re-building the learning model. Further, the model building module 243 may use the concatenated dataset for rebuilding the learning model using the one or more predefined model building techniques as explained above in detail. In some embodiments, the model building module 243 may deploy the rebuilt learning model into the external analytics system 115 to achieve accurate predictions of the user experience in a passive manner.

Figure 3:
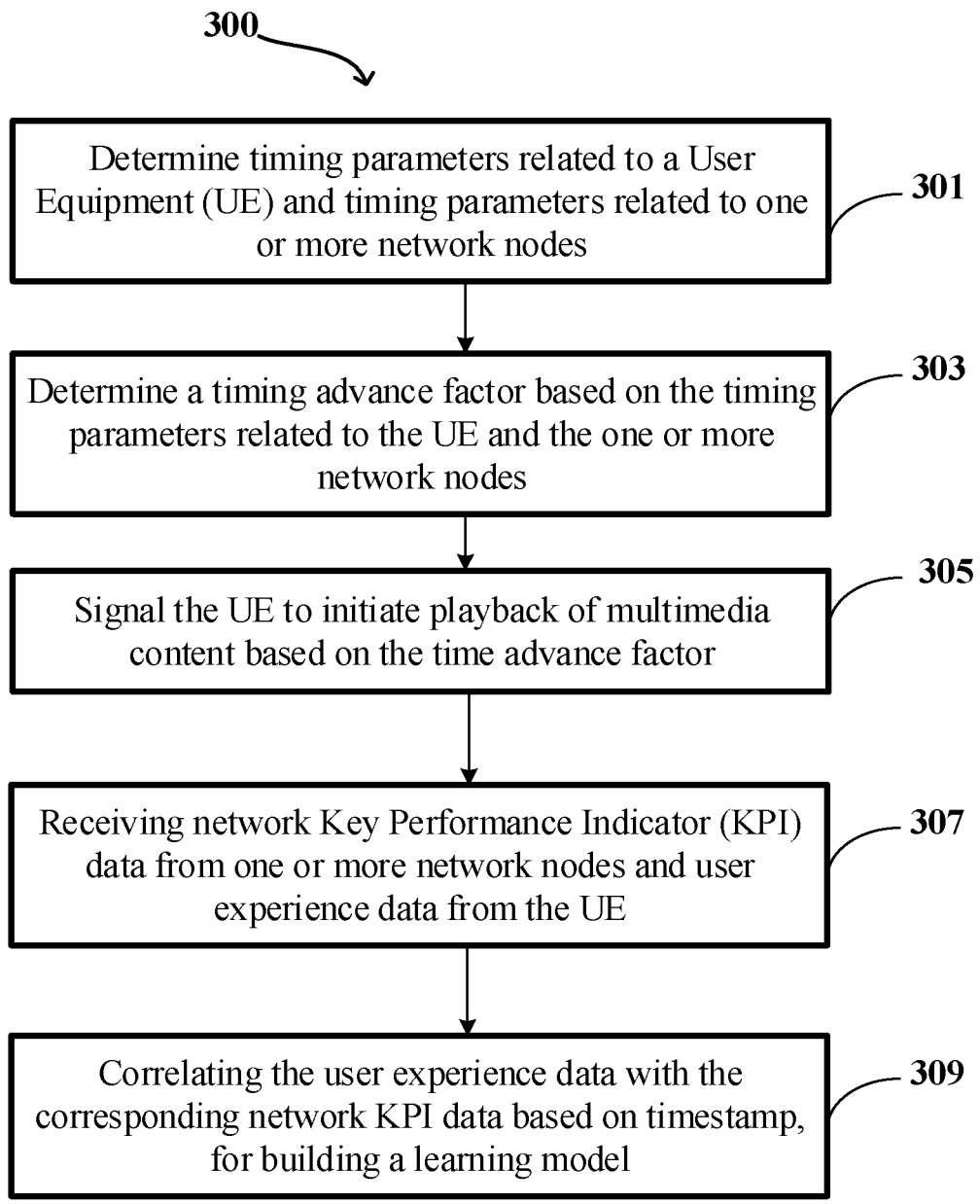
FIG. 3 shows a flowchart illustrating a method of generating synchronized labelled training dataset for building a learning model in accordance with some embodiments of the present disclosure.

FIG. 3 shows a flowchart illustrating a method of generating synchronized labelled training dataset for building a learning model in accordance with some embodiments of the present disclosure.

As illustrated in FIG. 3, the method 300 includes one or more blocks illustrating a method of generating synchronized labelled training dataset for building a learning model. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include determining, by a processor 109 configured in a training data generation system 107, timing parameters related to a User Equipment (UE) 101 capable of receiving a multimedia content and timing parameters related to one or more network nodes 103 used to facilitate streaming of the multimedia content to the UE 101.

At block 303, the method 300 may include determining, by the processor 109, a timing advance factor based on the timing parameters related to the UE 101 and the timing parameters related to the one or more network nodes 103 to achieve time synchronization between the UE 101 and the one or more network nodes 103. In some embodiments, the timing advance factor may compensate latency between the processor 109, the UE 101, and the one or more network nodes 103.

At block 305, the method 300 may include signalling, by the processor 109, the UE 101 to initiate playback of the multimedia content based on the timing advance factor. The timing advance factor ensures that the multimedia content is initiated in the UE 101 in tandem with instant at which collection of the network KPI data 209 starts in the one or more network nodes 103.

At block 307, the method 300 may include receiving, by the processor 109, network Key Performance Indicator (KPI) data 209 from the one or more network nodes 103 and a user experience data 211 from the UE 101, concurrently, for the streamed multimedia content. In some embodiments, the network KPI data 209 may include, but not limited to, type of network KPIs and corresponding data types, network node layer ID, network KPI record count per sample, network KPI values, the predefined sample intervals and timestamp of network KPI records. In some embodiments, the user experience data 211 may include, but not limited to, UE Identifier (ID), multimedia content type, predefined sample intervals, Mean Opinion Score (MOS), timestamp of the MOS and a label type.

At block 309, the method 300 may include correlating, by the processor 109, the user experience data 211 with the corresponding network KPI data 209, based on timestamp corresponding to the user experience data 211 and the network KPI data 209, to generate a synchronized labelled training dataset 213 for building a learning model. In some embodiments, the processor 109 may build the learning model using one or more predefined model building techniques. Further, the processor 109 may deploy the learning model in an external analytics system 115 associated with the training data generation system 107. Furthermore, the processor 109 may validate the learning model using a simulated environment created by network service providers associated with the training data generation system 107 at regular intervals, upon receiving a trigger from the CCM 105. Based on result of the validation, the processor 109 may rebuild the learning model.

Figure 4:
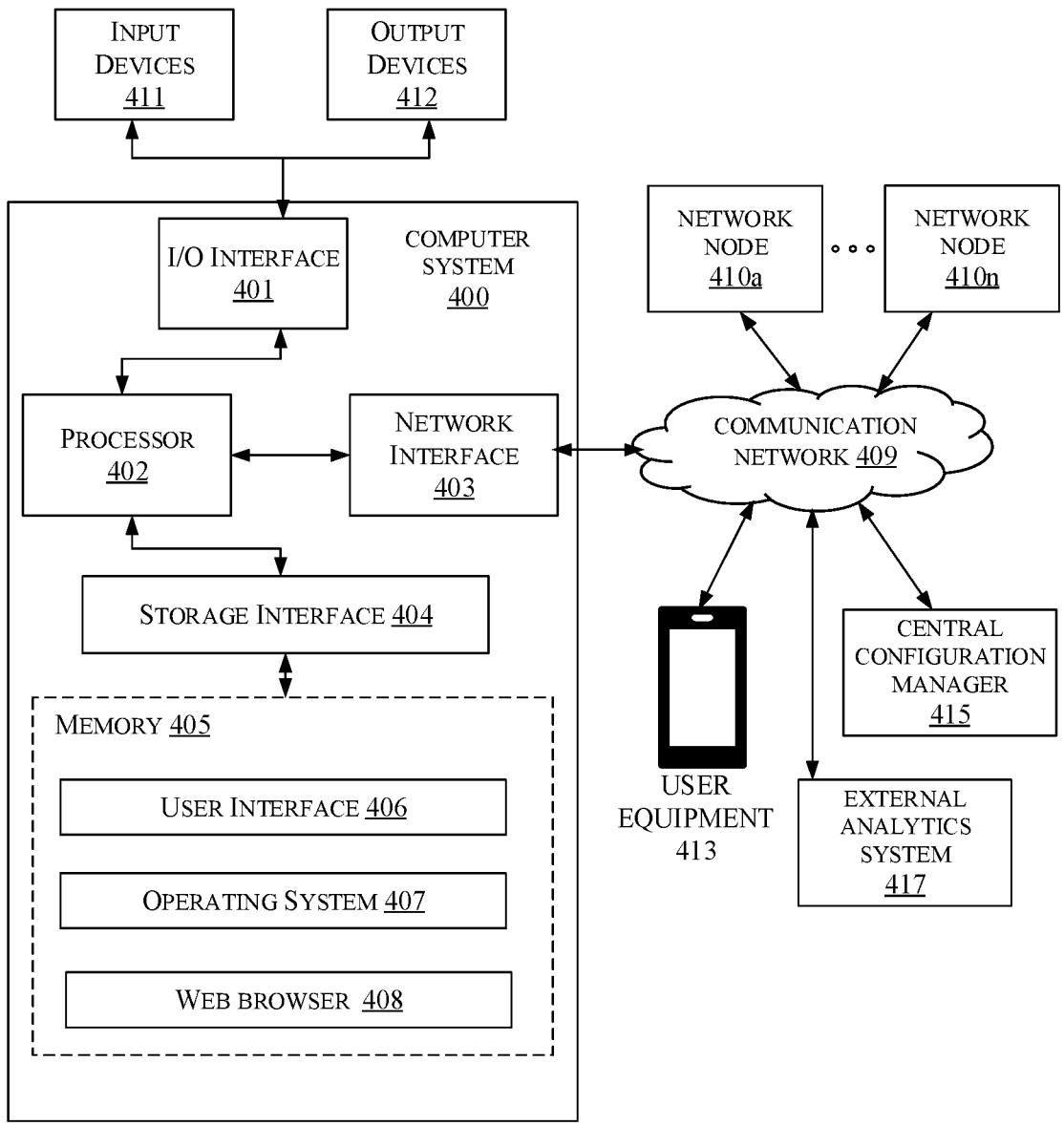
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be a training data generation system 107 that is used for generating a synchronized labelled training dataset 213 for building a learning model. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more network nodes 410 (a . . . n), a User Equipment (UE) 413, a Central Configuration Manager (CCM) 415 and an external analytics system 417. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more network nodes 410 (a . . . n) may include, but not limited to, Evolved NodeBs (eNodeB). The UE 413 may include, but not limited to, a mobile, a tablet, a laptop and a desktop. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

Operating system 407 may facilitate resource management and operation of computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS GOOGLE™ ANDROID, BLACKBERRY® OS, or the like. User interface 406 may facilitate display, execution, interaction, manipulation, or operation of program components through textual or graphical facilities. For example, user interfaces may provide computer interaction interface elements on a display system operatively connected to computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows (e.g., Aero, Metro, etc.), web interface libraries (e.g., ActiveX®, Java®, Javascript®, AJAX, HTML, Adobe® Flash®, etc.), or the like.

Computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. Computer system 400 may implement a mail server stored program component. The mail server may be an Internet mail server such as Microsoft Exchange, or the like. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In some embodiments, the present disclosure provides a method and a system for generating synchronized labelled training dataset for building a learning model.

The present disclosure provides a feature wherein effective time synchronization is performed between the User Equipment (UE), one or more network nodes and a training data generation system based on a timing advance factor determined by the training data generation system. The time synchronization reduces time and efforts involved in correlating data such as network KPI data and user experience data received from multiple sources.

The present disclosure provides a feature wherein the learning model built and deployed into an external analytics system acts as a non-intrusive passive probe to predict real-time user experience, without intruding into the UE, thereby sustaining privacy of the user. Also, the non-intrusive passive probe mechanism may eliminate additional computing load on the UE without using an external passive probe.

The present disclosure provides a feature wherein the user experience data received from the UE is subjected to quality check, for understanding usability of the user experience data of that sample, for building the learning model.

The present disclosure provides a feature wherein accuracy of real-time predictions of the external analytics system is validated at regular intervals.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating synchronized labelled training dataset for building a learning model. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of generating synchronized labelled training dataset for building a learning model, the method comprising:
   determining, by a training data generation system, timing parameters related to a User Equipment (UE) capable of receiving a multimedia content and timing parameters related to one or more network nodes used to facilitate streaming of the multimedia content to the UE;
   computing, by the training data generation system, a timing advance factor using round trip time (RTT) based on the timing parameters related to the UE and the timing parameters related to the one or more network nodes to achieve time synchronization between the UE and the one or more network nodes;
   signalling, by the training data generation system, the UE to initiate playback of the multimedia content based on the timing advance factor;
   receiving, by the training data generation system, network Key Performance Indicator (KPI) data from the one or more network nodes and a user experience data from the UE, concurrently, for the streamed multimedia content, based on a metadata model configured by a Central Configuration Manager (CCM) thereby enabling communication of the training data generation system with the one or more network nodes and the UE; and
   correlating, by the training data generation system, the user experience data with the corresponding network KPI data, based on timestamp corresponding to the user experience data and the network KPI data, to generate a synchronized labelled training dataset for building a learning model.

2. The method as claimed in claim 1, wherein the user experience data comprises at least one of UE Identifier (ID), multimedia content type, predefined sample intervals, Mean Opinion Score (MOS), timestamp of the MOS and a label type.

3. The method as claimed in claim 1, wherein the network KPI data comprises at least one of type of network KPIs and corresponding data types, network node layer Identifier (ID), network KPI record count per sample, network KPI values, predefined sample intervals and timestamp of network KPI records.

4. The method as claimed in claim 1, wherein the timing parameters related to the UE comprises of RTT for receiving the user experience data.

5. The method as claimed in claim 1, wherein the timing parameters related to the one or more nodes, comprises at least one of, RTT for receiving the network KPI data, predefined sample intervals, and timestamp of network KPI records per sample.

6. The method as claimed in claim 1, wherein the user experience data and the network KPI data are received by the training data generation system at predefined sample intervals.

7. The method as claimed in claim 1, wherein the learning model is built using one or more predefined model building techniques.

8. The method as claimed in claim 1 further comprises deploying, by the training data generation system, the learning model in an external analytics system for enabling the external analytics system to perform real-time predictions of user experience when the multimedia content is streamed.

9. The method as claimed in claim 8 further comprises validating, by the training data generation system, accuracy of the real-time predictions of the user experience by comparing the user experience data received from the UE with the real-time predictions of the user experience.

10. The method as claimed in claim 9 further comprises rebuilding, by the training data generation system, the learning model, at regular intervals, based on current user experience data and current network KPI data, when result of the validation is negative.

11. The method as claimed in claim 1, wherein the user experience data is determined by at least one of predefined deep learning techniques configured in the UE, or by a Subject Matter Expert (SME) associated with the UE.

12. The method as claimed in claim 1, wherein the UE and the one or more network nodes are preconfigured with parameters related to the network KPI data, the time synchronization and rebuilding criteria for the learning model, by the CCM associated with the training data generation system.

13. The method as claimed in claim 1 further comprises:
   determining, by the training data generation system, a transmission rating factor based on one or more network parameters related to streaming of the multimedia content to the UE; and
   evaluating, by the training data generation system, quality of the user experience data received from the UE, based on the transmission rating factor, to determine usability of the user experience data for building the learning model, prior to correlating the user experience data with the network KPI data.

14. A training data generation system for generating synchronized labelled training dataset for building a learning model, the training data generation system comprising:
   a processor; and
   a memory communicatively coupled to the processor, wherein the memory stores the processor-executable instructions, which, on execution, causes the processor to:
   determine timing parameters related to a User Equipment (UE) capable of receiving a multimedia content and timing parameters related to one or more network nodes used to facilitate streaming of the multimedia content to the UE;
   compute a timing advance factor using round trip time (RTT) based on the timing parameters related to the UE and the timing parameters related to the one or more network nodes to achieve time synchronization between the UE and the one or more network nodes;
   signal the UE to initiate playback of the multimedia content based on the timing advance factor;
   receive network Key Performance Indicator (KPI) data from the one or more network nodes and a user experience data from the UE, concurrently, for the streamed multimedia content, based on a metadata model configured by a Central Configuration Manager (CCM) thereby enabling communication of the training data generation system with the one or more network nodes and the UE; and
   correlate the user experience data with the corresponding network KPI data, based on timestamp corresponding to the user experience data and the network KPI data, to generate a synchronized labelled training dataset for building a learning model.

15. The training data generation system as claimed in claim 14, wherein the user experience data comprises at least one of UE Identifier (ID), multimedia content type, predefined sample intervals, Mean Opinion Score (MOS), timestamp of the MOS and a label type.

16. The training data generation system as claimed in claim 14, wherein the network KPI data comprises at least one of type of network KPIs and corresponding data types, network node layer Identifier (ID), network KPI record count per sample, network KPI values, predefined sample intervals and timestamp of network KPI records.

17. The training data generation system as claimed in claim 14, wherein the timing parameters related to the UE comprises of RTT for receiving the user experience data.

18. The training data generation system as claimed in claim 14, wherein the timing parameters related to the one or more nodes, comprises at least one of, RTT for receiving the network KPI data, predefined sample intervals, and timestamp of network KPI records per sample.

19. The training data generation system as claimed in claim 14, wherein the processor receives the user experience data and the network KPI data at predefined sample intervals.

20. The training data generation system as claimed in claim 14, wherein the learning model is built using one or more predefined model building techniques.

21. The training data generation system as claimed in claim 14, wherein the processor is further configured to deploy the learning model in an external analytics system, for enabling the external analytics system to perform real-time predictions of user experience when the multimedia content is streamed.

22. The training data generation system as claimed in claim 21, wherein the processor is further configured to validate accuracy of the real-time predictions of the user experience by comparing the user experience data received from the UE with the real-time predictions of the user experience.

23. The training data generation system as claimed in claim 22, wherein the processor is further configured to rebuild the learning model, at regular intervals, based on current user experience data and current network KPI data, when result of the validation is negative.

24. The training data generation system as claimed in claim 14, wherein the user experience data is determined by at least one of predefined deep learning techniques configured in the UE, or by a Subject Matter Expert (SME) associated with the UE.

25. The training data generation system as claimed in claim 14, wherein the UE and the one or more network nodes are preconfigured with parameters related to the network KPI data, the time synchronization and rebuilding criteria for the learning model, by the CCM associated with the training data generation system.

26. The training data generation system as claimed in claim 14, wherein the processor is further configured to:
determine a transmission rating factor based on one or more network parameters related to the streaming of the multimedia content to the UE; and
evaluate quality of the user experience data received from the UE, based on the transmission rating factor, to determine usability of the user experience data for building the learning model, prior to correlating the user experience data with the network KPI data.

27. A non-transitory computer readable medium including instructions stored thereon that when processed by at least one processor causes a training data generation system to perform operations comprising:
determining timing parameters related to a User Equipment (UE) capable of receiving a multimedia content and timing parameters related to one or more network nodes used to facilitate streaming of the multimedia content to the UE;
computing a timing advance factor using round trip time (RTT) based on the timing parameters related to the UE and the timing parameters related to the one or more network nodes to achieve time synchronization between the UE and the one or more network nodes;
signalling the UE to initiate playback of the multimedia content based on the timing advance factor;
receiving network Key Performance Indicator (KPI) data from the one or more network nodes and a user experience data from the UE, concurrently, for the streamed multimedia content, based on a metadata model configured by a Central Configuration Manager (CCM) thereby enabling communication of the training data generation system with the one or more network nodes and the UE; and
correlating the user experience data with the corresponding network KPI data, based on timestamp corresponding to the user experience data and the network KPI data, to generate a synchronized labelled training dataset for building a learning model.

* * * * *